United States Patent
Zwicklhuber et al.

(10) Patent No.: US 10,293,549 B2
(45) Date of Patent: May 21, 2019

(54) ARRANGEMENT FOR CONSOLIDATING THERMO-PLASTIC SEMI-FINISHED PRODUCTS

(71) Applicant: ENGEL AUSTRIA GmbH, Schwertberg (AT)

(72) Inventors: Paul Zwicklhuber, Kremsmuenster (AT); Gregor Hartung, Steyr (AT); Sebastian Picheta, Sankt Florian (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 183 days.

(21) Appl. No.: 15/266,148

(22) Filed: Sep. 15, 2016

(65) Prior Publication Data
US 2017/0080635 A1 Mar. 23, 2017

(30) Foreign Application Priority Data
Sep. 17, 2015 (AT) .................... A 608/2015

(51) Int. Cl.
*B29C 65/02* (2006.01)
*B29C 71/02* (2006.01)
(Continued)

(52) U.S. Cl.
CPC .............. *B29C 65/02* (2013.01); *B29C 45/04* (2013.01); *B29C 71/02* (2013.01); *B29C 45/72* (2013.01);
(Continued)

(58) Field of Classification Search
None
See application file for complete search history.

(56) References Cited

U.S. PATENT DOCUMENTS 2,967,568 A * 1/1961 Friday ...................... D21J 7/00
162/382
3,732,051 A * 5/1973 Sakabe ................. B29C 44/388
425/357
(Continued)

FOREIGN PATENT DOCUMENTS

CN 86105159 2/1987
CN 104275782 1/2015
(Continued)

OTHER PUBLICATIONS

English Translation of Search Report dated Jun. 20, 2018 in Chinese Patent Application No. 20161080248803.

*Primary Examiner* — Matthew J Daniels
*Assistant Examiner* — Mohammad M Ameen
(74) *Attorney, Agent, or Firm* — Wenderoth, Lind & Ponack, L.L.P.

(57) ABSTRACT

An arrangement for consolidating thermoplastic semi-finished products includes a heating station for heating a semi-finished product, and a tempering station for tempering, in particular cooling, the semi-finished product. At least one mold can be arranged in the heating station and in the tempering station, and comprises a cavity for receiving the semi-finished product, the cavity substantially corresponding to a form of the semi-finished product. A mold transport device can transport the at least one mold from the heating station into the tempering station, and from the tempering station into the heating station.

19 Claims, 8 Drawing Sheets

(51) Int. Cl.
  *B29C 45/04* (2006.01)
  *B29L 9/00* (2006.01)
  *B29C 45/72* (2006.01)
  *B29K 105/06* (2006.01)
  *B29C 51/42* (2006.01)

(52) U.S. Cl.
  CPC ........ *B29C 51/425* (2013.01); *B29K 2105/06* (2013.01); *B29L 2009/00* (2013.01)

(56) References Cited

U.S. PATENT DOCUMENTS

| | | | |
|---|---|---|---|
| 3,840,239 A * | 10/1974 | Fazekas | B29C 43/3607 277/644 |
| 4,436,500 A * | 3/1984 | Allen | A23G 1/21 141/137 |
| 4,720,253 A * | 1/1988 | Koentges | B23Q 41/00 264/40.7 |
| 4,826,560 A | 5/1989 | Held | |
| 4,844,766 A | 7/1989 | Held | |
| 5,075,051 A | 12/1991 | Ito et al. | |
| 6,022,503 A * | 2/2000 | Hudkins | D06N 7/0071 156/312 |
| 6,637,496 B1 * | 10/2003 | Macheske | B22D 5/02 164/119 |
| 6,719,551 B2 | 4/2004 | Polk, Jr. | |
| 6,869,558 B2 | 3/2005 | Polk, Jr. et al. | |
| 6,900,547 B2 | 5/2005 | Polk, Jr. et al. | |
| 7,208,219 B2 | 4/2007 | Polk, Jr. et al. | |
| 8,192,664 B2 | 6/2012 | Polk, Jr. et al. | |
| 9,701,094 B2 | 7/2017 | Krahnert et al. | |
| 2002/0098256 A1 | 7/2002 | Polk, Jr. | |
| 2003/0232176 A1 | 12/2003 | Polk, Jr. et al. | |
| 2004/0241386 A1 | 12/2004 | Polk, Jr. et al. | |
| 2004/0253429 A1 | 12/2004 | Polk, Jr. et al. | |
| 2004/0253430 A1 | 12/2004 | Polk, Jr. et al. | |
| 2006/0008967 A1 | 1/2006 | Polk, Jr. et al. | |
| 2012/0211919 A1 | 8/2012 | Polk, Jr. et al. | |
| 2015/0321450 A1 | 11/2015 | Krahnert et al. | |

FOREIGN PATENT DOCUMENTS

| | | |
|---|---|---|
| DE | 10 2008 015 534 | 10/2009 |
| JP | 2-38012 | 2/1990 |
| KR | 10-2005-0111305 | 11/2005 |
| KR | 10-2015-0065653 | 6/2015 |

* cited by examiner

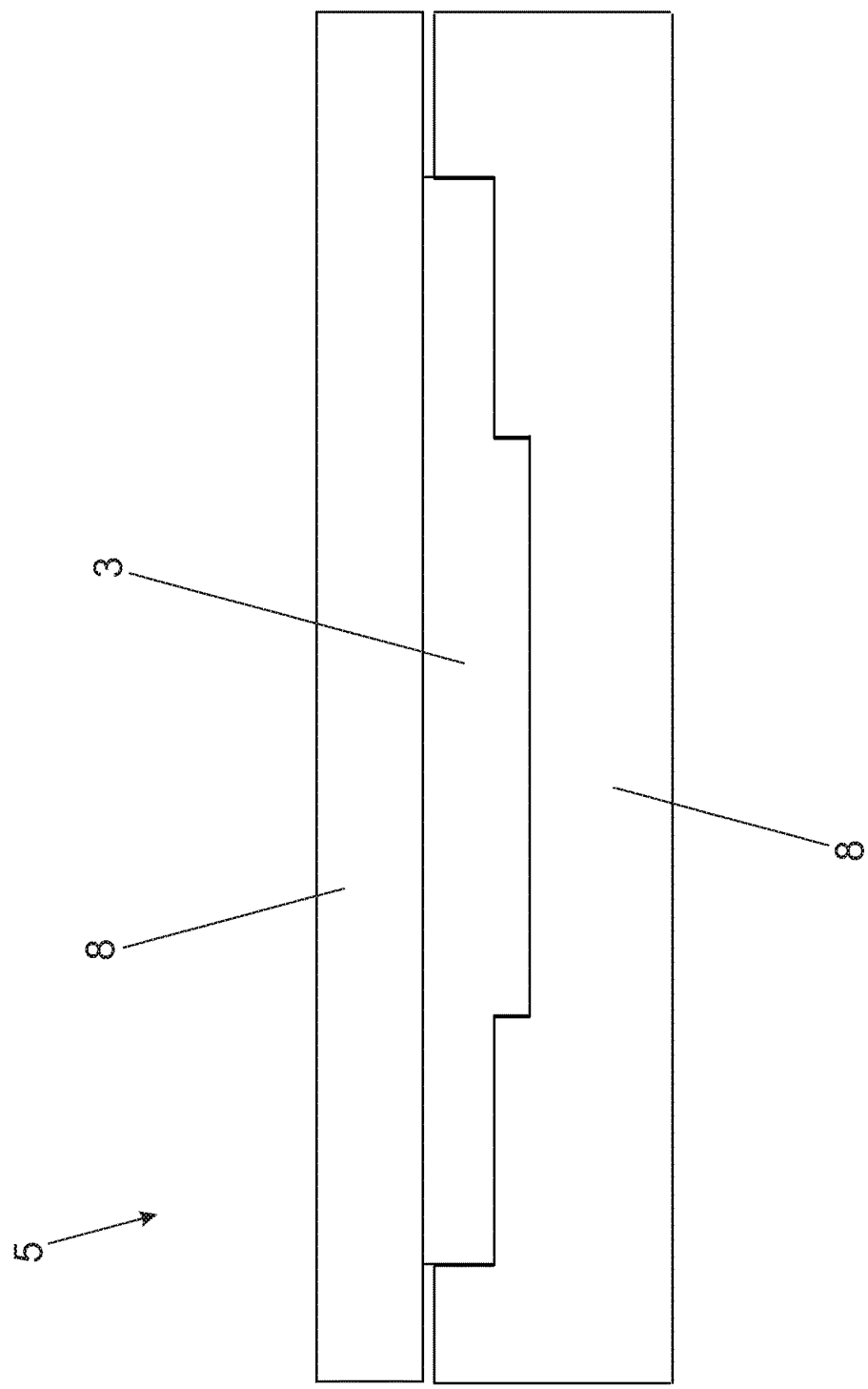

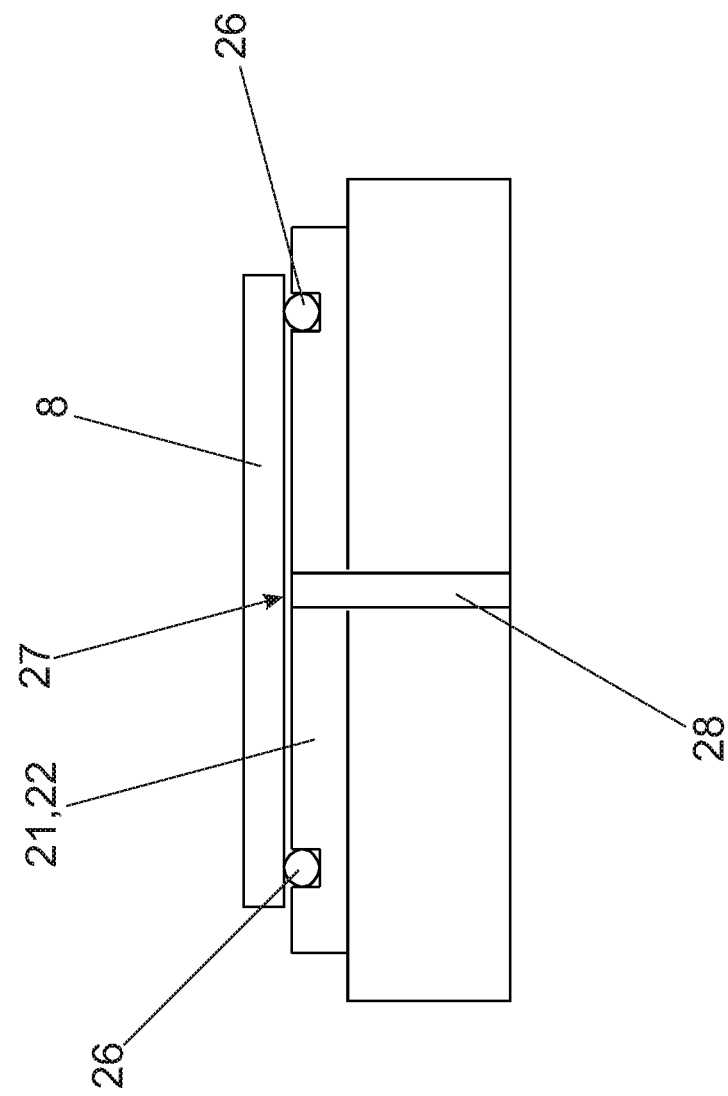

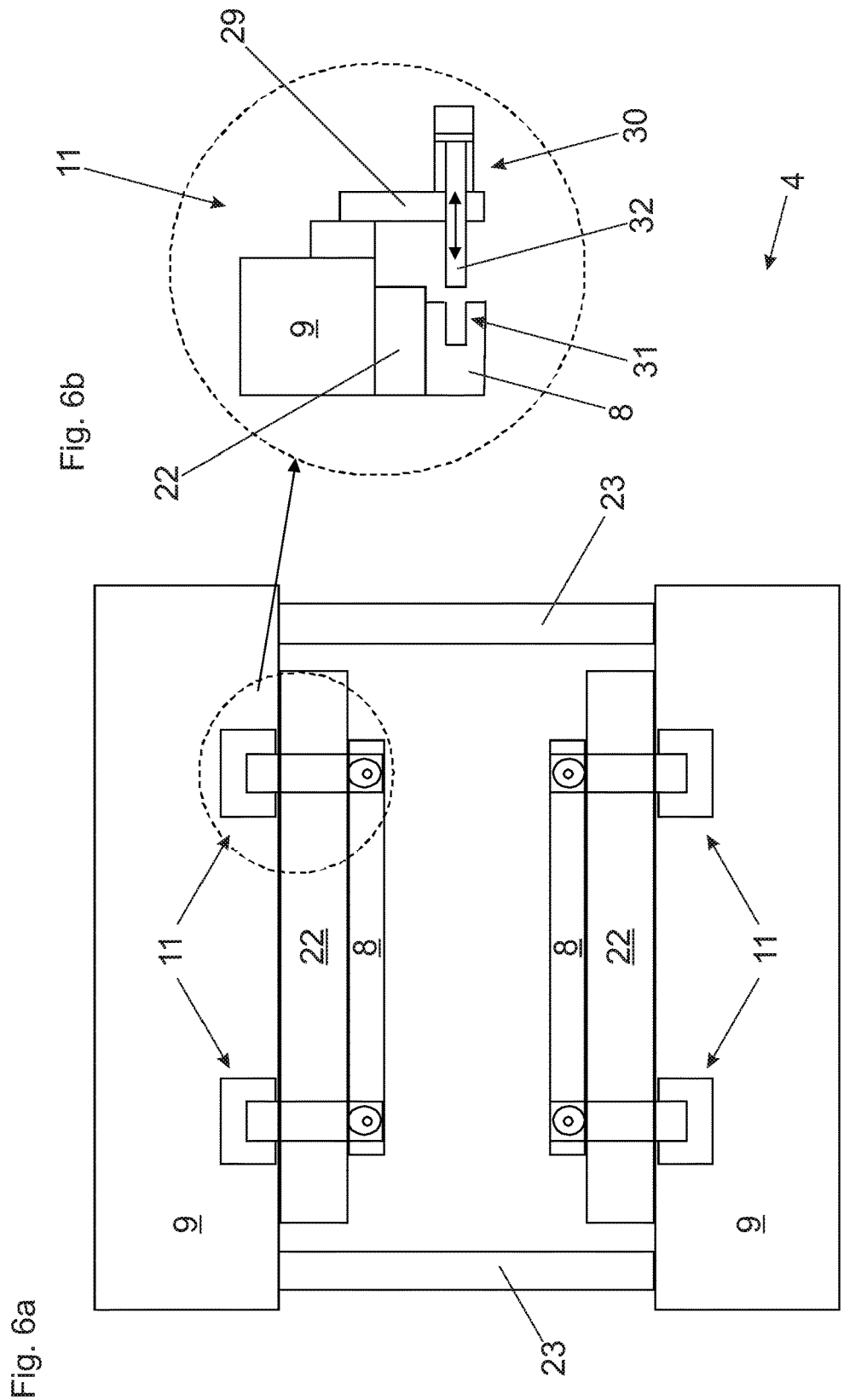

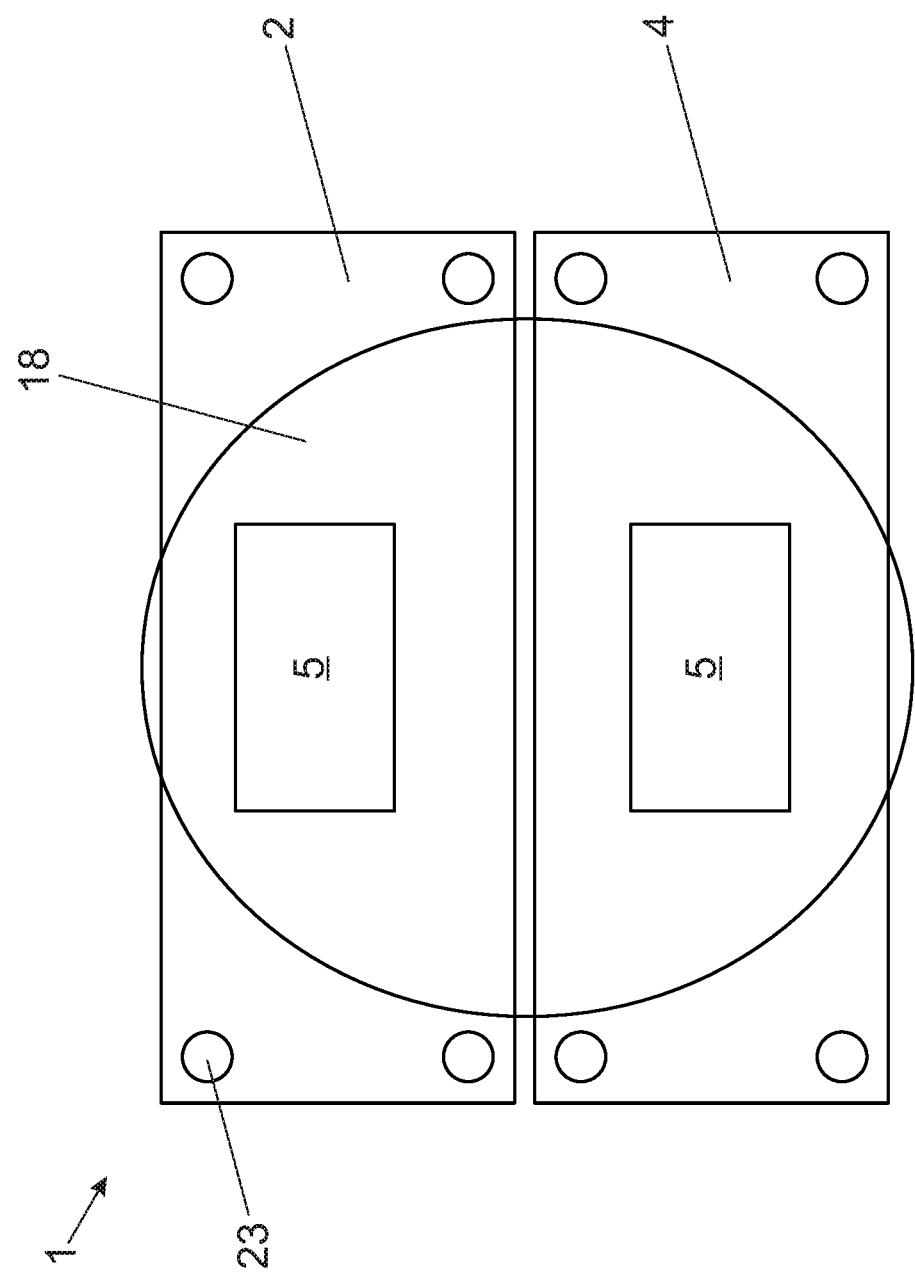

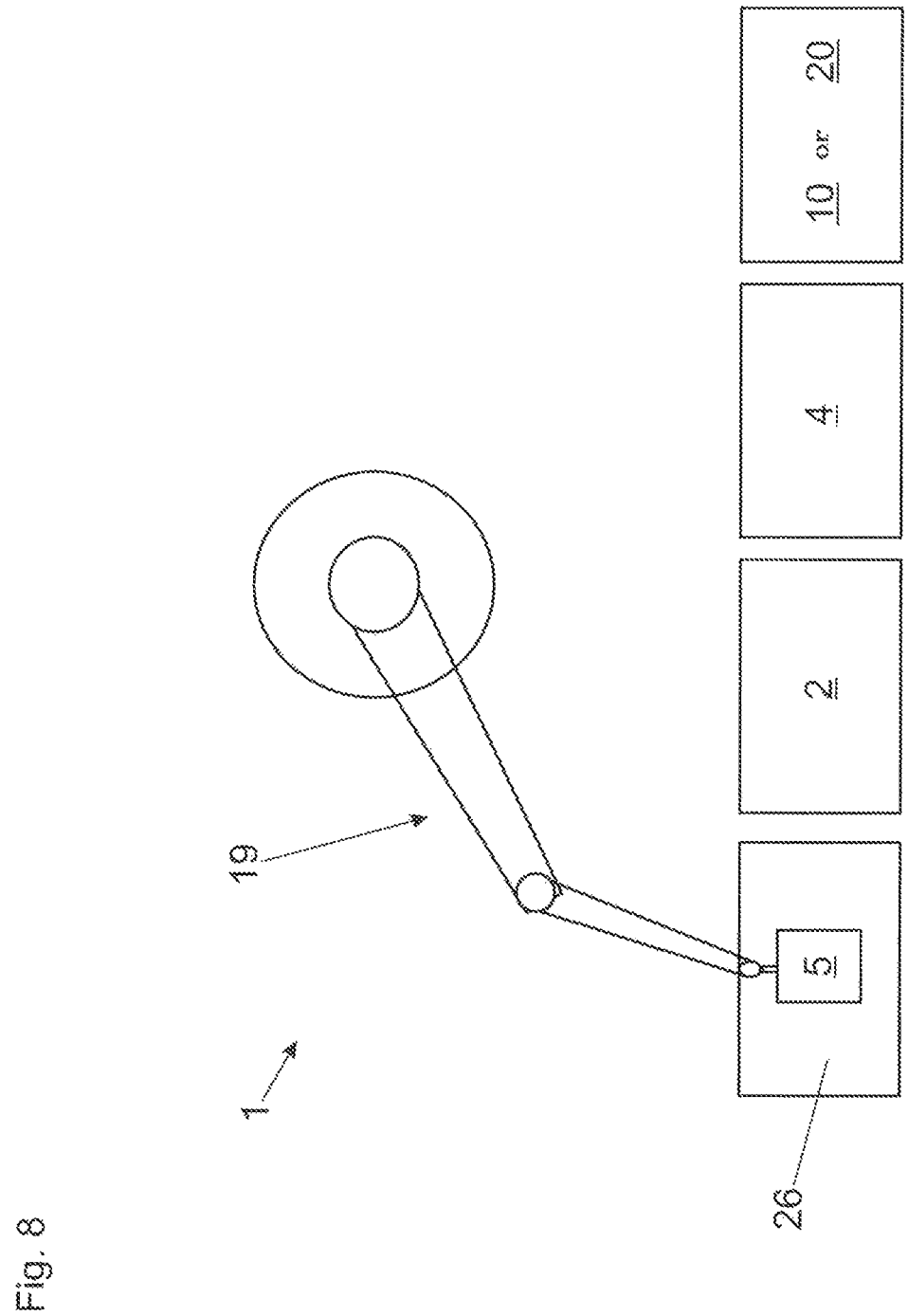

ARRANGEMENT FOR CONSOLIDATING THERMO-PLASTIC SEMI-FINISHED PRODUCTS

FIELD OF THE INVENTION

The present invention concerns an arrangement for consolidating thermoplastic semi-finished products.

BACKGROUND OF THE INVENTION

Looking at the trends in the construction of composite components, it can be observed that the fiber-reinforcements are used selectively local where they are necessary. An efficient and also cost-effective lightweight construction is possible by the local use of the reinforcements. By the local use of fiber-reinforcements, leaps of the wall thickness are occurring frequently in the semi-finished product.

In order to mention a method which produces such semi-finished products selectively adjusted to the component, for example tape-laying of thermoplastic tapes has to be quoted. Here, tapes of different lengths, widths and orientations—which can also be fiber-reinforced—are placed down onto each other in order to selectively modify the mechanical characteristics. By the selective modification, leaps of the wall thickness cannot be avoided oftentimes.

There are different approaches in the different tape laying methods how such tapes are attached on each other. On the one hand, there are methods which connect the tapes holohedral and, thus, do not need subsequent consolidation of the semi-finished products. On the other hand, there are methods which partially weld or stick together the tapes and, thus, necessitate a subsequent consolidation.

For consolidation of such semi-finished products, double-belt presses are currently primarily used. Looking at the double-belt presses more precisely, three design variants for the consolidation of thermoplastic composites can be named. On the one hand, there are double-belt presses which use PTFE foils for transporting the semi-finished products. PTFE foils, however, only allow low pressures and low temperatures.

Further, there are also double-belt presses which use metallic strips for supporting the semi-finished products. With these metallic strips, higher temperatures and also higher pressures are possible. Such double-belt presses work continuously. The semi-finished product is inserted and passes a certain heating line till it reaches consolidation temperature. As soon as this temperature is reached, consolidation pressure is exerted onto the semi-finished product in order to connect the single layers with each other. Subsequently, the semi-finished product is again cooled in the cooling line and can subsequently be removed from the press.

There are also double-belt presses which work discontinuously. There, the semi-finished product is laid onto a conveyor belt and subsequently heated in a first press to a consolidation temperature, transported into the cooling press via the conveyor belt, and finally pressed and cooled under a specific consolidation pressure.

Both of these systems are working very well as long as it concerns flat semi-finished products. If, however, having a semi-finished product with several wall thicknesses, a consolidation with such press systems is considerably more complex. In order to produce semi-finished products with several thicknesses, matrices have to be used which compensate these leaps of the wall thicknesses. Thus, it is possible to produce semi-finished products with different wall thicknesses. However, the process is losing economic efficiency, because the matrices have to be additionally placed again and again on the semi-finished products.

SUMMARY OF THE INVENTION

The object of the invention is to provide an arrangement for consolidating thermoplastic semi-finished products, wherein semi-finished products with wall thickness changes can be consolidated in an easier manner compared to the Prior Art.

This object is reached by providing at least one mold which can be arranged in the heating station and in the tempering station and which comprises a cavity for receiving the semi-finished product. The cavity substantially corresponds to a form of the semi-finished product, and a mold transport device with which the at least one mold is transportable from the heating station into the tempering station and from the tempering station into the heating station.

Because by use of a mold, in which semi-finished products are discontinuously consolidated in two stations, thickness leaps in the semi-finished product do not have influence during consolidation. Furthermore, by the mold transport device, the invention can reach a higher degree of automation, whereby production is very economical.

A further advantage of the invention consists in a very compactly constructed arrangement.

A temperature control with very short heating time can be realized by the use of separate stations for the heating and for the cooling or tempering, whereby a negative influence on the cycle time of a pursuing production is avoided.

The transport between the heating station and the tempering station does not have to take place directly. In particular, at the transport of the at least one mold from the tempering station to the heating station one or more other stations can operate intermediary. Only important is an at least partly automated return of the mold to the heating station. Examples of such intermediary stations are receiving stations, removing stations, and equipping stations.

The arrangement can preferably comprise two press units. The semi-finished product is heated in a first press to the consolidation temperature (heating station), and is thus far cooled in a cooling press (tempering station), so that it can be demolded.

It is particularly preferred that at least two molds are provided. In particular, the mold transport device can be constructed in such a way to allow a simultaneous position change of the molds between the heating station and the tempering station (the mold transport device then turns into a mold change device). However, more than two molds can be used. In particular, the number of molds can correspond to the number of utilized stations.

The at least one mold can be transportable from the tempering station to the heating station via the mold transport device.

The at least one mold can comprise at least two mold parts, in which the cavity is existent when the at least two mold parts abut each other and wherein the mold can be opened by moving the mold parts away from each other. Alternatively, the cavity can already be existent when a small distance is still given between the two mold parts. It is only important that the cavity ensures that during consolidation the semi-finished product stays in the desired form.

Particularly preferable, the cavity can be unchangeable in its form. Moreover, the cavity can preferably represent at least one wall thickness change.

In a particularly preferred embodiment, the heating station and/or the tempering station comprises platens movable relative to each other for opening and closing the heating station and/or the tempering station. This represents a particularly easy embodiment. However, it is also possible that the heating and/or tempering station each comprise two plates, whereby both of the stations can be operated independently from each other. Thereby, further cycle time reductions are possible.

The tempering station can comprise at least one coupling element with which at least one of the at least two mold parts can be coupled to at least one of the platens, whereby the mold can be opened by opening the tempering station. Thus, the tempering station can be simultaneously used for opening the mold and for removing the consolidated semi-finished product. Concerning cycle time this does not normally represent a problem, because the heating in the heating station typically takes most of the time.

In a further variant, a demold station separate from the heating station and from the tempering station can be provided, with which the semi-finished product is removable from the at least one mold. The at least one mold is transportable from the tempering station to the demold station by the mold transport device. Of course, the demold station can also comprise at least one corresponding coupling element in order to particularly easily perform the demolding.

Further, it is possible that there is a separate receiving station in which the semi-finished product is inserted and preferably pre-tempered. To that, the receiving station can also comprise at least one corresponding coupling element in order to open and close the mold, so that a semi-finished product can be inserted.

Particularly preferably, the mold transport device can comprise a belt drive. This represents a particular easy constructive embodiment, and a relative high flexibility is simultaneously reached when designing the construction.

If a belt drive is used, a latching device can be advantageous, with which the at least one mold can be latched to the belt drive and can be unlatched from the belt drive. The mold can then be adapted to the level of the press. This enables use of both lines of a belt drive simultaneously.

In a particularly easy embodiment of this kind, the latching device can comprise—preferably pneumatically—movable pins. These pins can interact for latching with openings at the mold. It is, however, also possible that no openings are provided and the pins hold the mold in a force-fitting manner. To that, the pins can be formed as a mandrel on the side facing to the mold, and can be made from a harder material than the mold. Therefore, the mandrels are pressed into the mold and can take up the mold.

The mentioned level compensation between the belt drive and the stations can be solved by lifting devices, with which the at least one mold can be lifted, wherein—preferably at least—two hydraulic cylinders are provided for lifting. However, there can also be only one hydraulic cylinder which acts beyond the mass point of the mold. It can also be provided to drive two, three, four or more rods with one hydraulic cylinder, which can lift and lower the mold. A lifting device can also be employed in examples of the mold transport device without belt drive.

However, the mold transport device can also comprise a rotary table and/or a handling robot.

A molding machine can also be a part of the arrangement. Preferably, the mold transport device can also be provided for the transport of the semi-finished products to the molding machine. However, a separate transport device can also be used which transports already demolded semi-finished products to the molding machine. For this, as mentioned, a separate demold station can be used, or the demolding can take place in the tempering station.

Examples for the mentioned molding machines are injection molding machines, presses, injection presses, and the like.

The heating station can comprise heating plates for heating the at least one mold. The tempering station can comprise tempering plates for tempering, particularly cooling, the at least one mold.

A suction device and at least one seal for substantially hermetically sealing a room between the at least one mold on the one hand, and the heating plates and/or the tempering plates on the other hand can be provided. The seal can be formed flexible in such a way that the at least one mold contacts the heating plates and/or the tempering plates when the room is put under low pressure by the suction device. The seal can be arranged at the at least one mold or at the heating or tempering plates. The seal can at least be partly sunk, for example, in a groove or the like. Such an embodiment can have as an advantage that a flat contact or a surface pressure is ensured between mold and heating or tempering plates.

Protection is also sought for a method for consolidating thermoplastic semi-finished products, in which an arrangement according to the invention is used.

Particularly preferred can be a method, where initially fiber-reinforced tapes, which contain a thermoplastic material, are laid onto each other in order to produce the semi-finished product.

The method can include pre-warming the semi-finished product in the tempering station before it is heated in the heating station. A particular short period of time for consolidation can be reached by optimization of the pre-warming time in the tempering station and the heating time in the heating station.

BRIEF DESCRIPTION OF THE DRAWINGS

Further details and advantages of the present invention are described more fully hereinafter by means of the specific description with reference to the embodiments illustrated in the drawings, in which:

FIG. 4 is a detailed illustration of a mold,

FIG. 5 shows an optional aspect for pressing the at least one mold to the heating and/or tempering plate, FIG. 6a, 6b are two illustrations of coupling elements at an arrangement according to the invention, FIG. 7 shows an alternative embodiment of an arrangement according to the invention with a rotary table, and FIG. 8 shows a further alternative embodiment of an arrangement according to the invention with a handling robot.

DETAILED DESCRIPTION OF THE INVENTION

Figure 1:
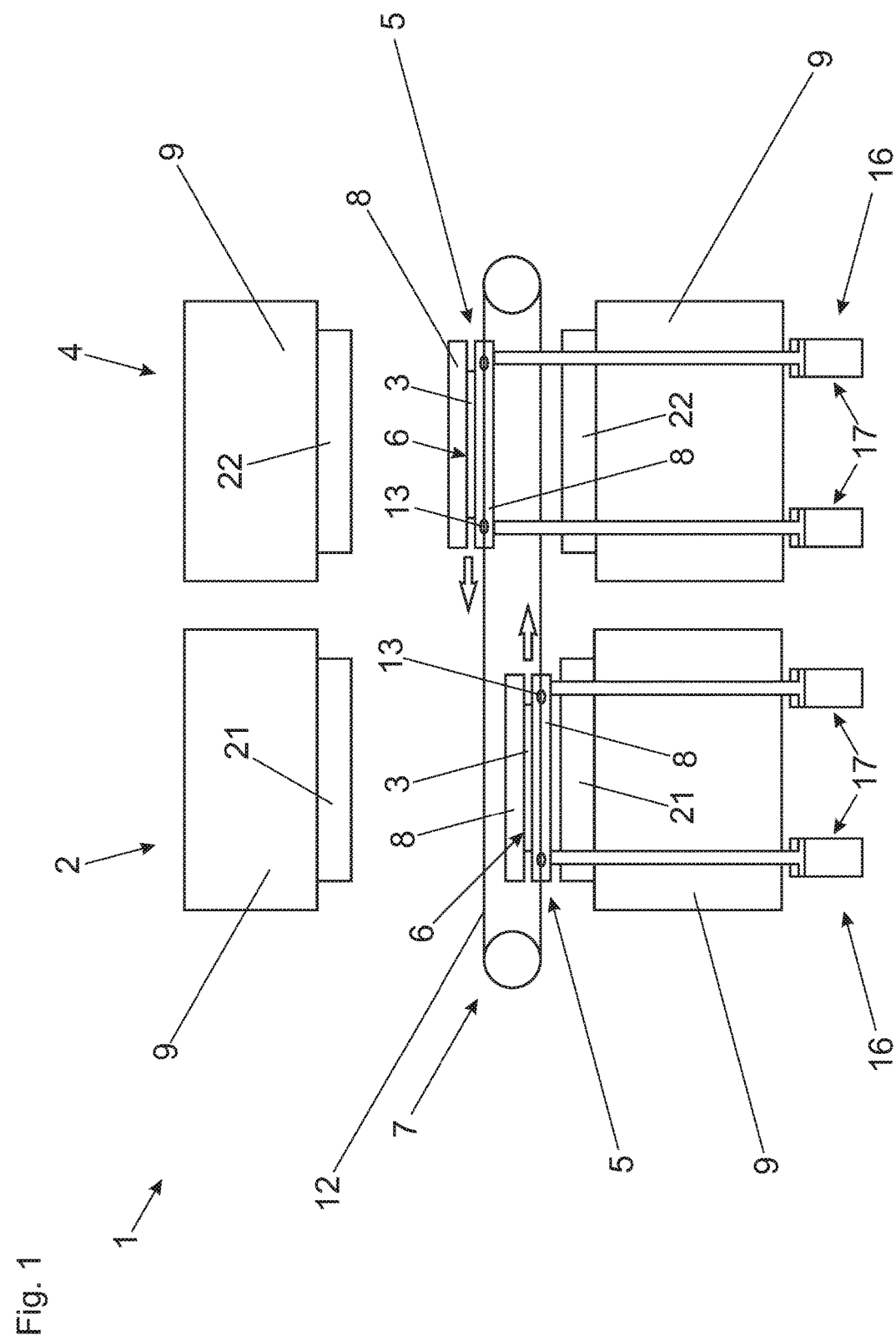
FIG. 1 is a schematic front view of an arrangement according to the invention.

FIG. 1 schematically shows an arrangement according to the invention. It comprises a heating station 2 and a tempering station 4. Both of the stations each comprise platens 9 movable relative to each other. The stations 2, 4 can preferably be formed as presses.

The heating station 2 comprises two heating plates 21 which are each arranged at one of the platens 9.

The tempering station 4 comprises two tempering plates 22 which are each attached at one of the platens 9. The tempering plates 22 are held at a specific temperature which is lower than the temperature of the heating plates 21. The tempering station 4 can not only serve for cooling the semi-finished products 3 heated in the heating station 2, but also serve for pre-warming the semi-finished products 3 before they are carried into the heating station 2.

Two molds 5 are provided which both can be arranged in the heating station 2 and in the tempering station 4.

The molds 5 each comprise two mold parts 8. In the closed state, the cavity 6 is existent between the mold parts 8. The cavity 6 ensures that the semi-finished product stays in the desired form also in the heated state.

The mold transport device 7 is provided for the transport of the molds 5 from the heating station 2 into the tempering station 4 or vice versa.

Figure 2:
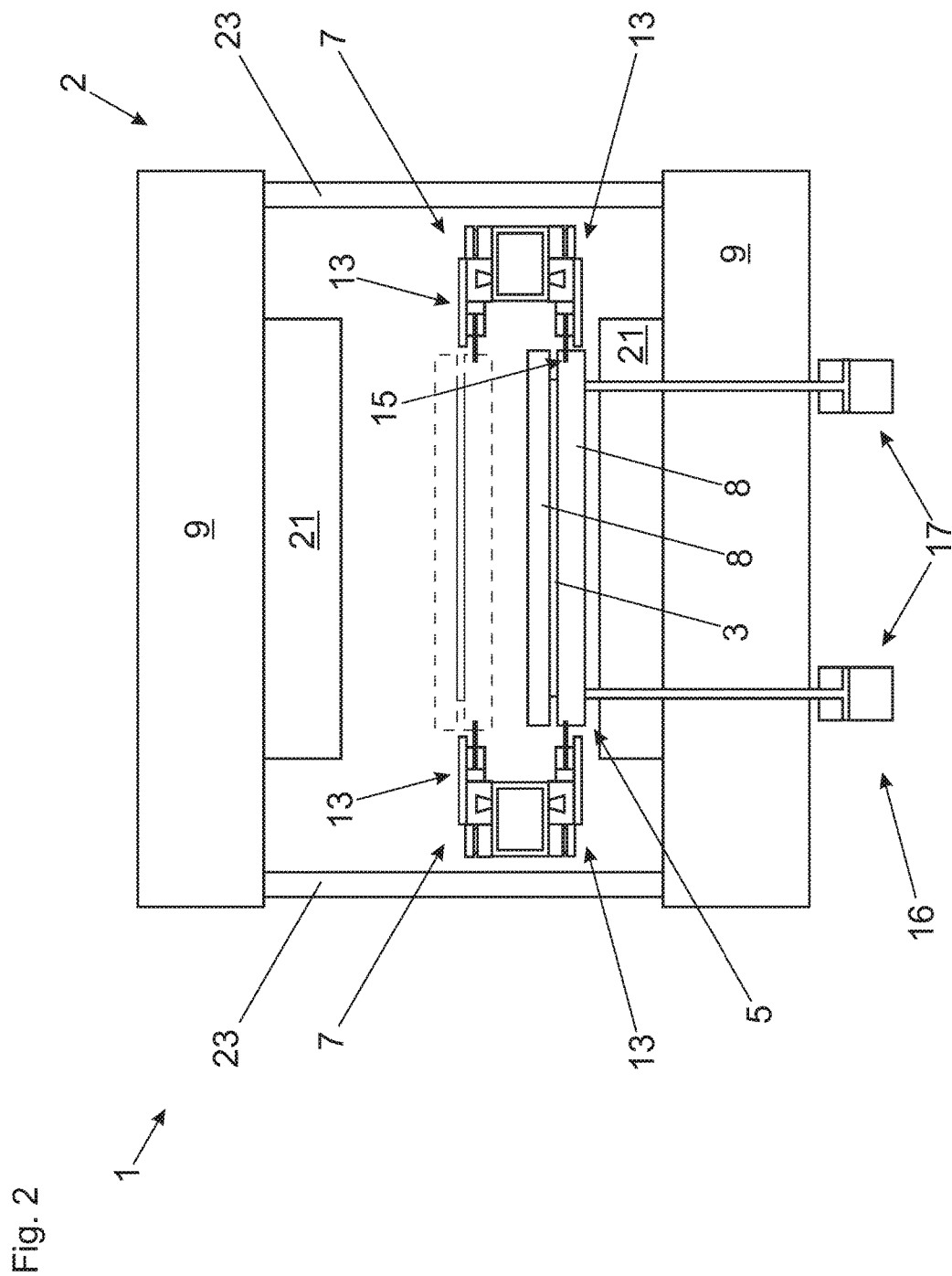
FIG. 2 is a schematic side view of an arrangement according to the invention.

In this embodiment, the mold transport device 7 comprises a belt drive 12 and a mold lifting device 16 in the heating station 2 as well as in the tempering station 4. The lifting devices 16 each comprise four hydraulic cylinders 17. (In the front view of FIG. 1 only two hydraulic cylinders 17 are visible. FIG. 2 should be noted.)

By acting upon the hydraulic cylinders 17 (can also be defined as piston/cylinder units) the molds 5 can be lifted or sunk to the desired level by rods connected to the piston of the hydraulic cylinders 17. The hydraulic cylinders 17 can also be formed as pneumatic cylinders or the like.

Figure 3:
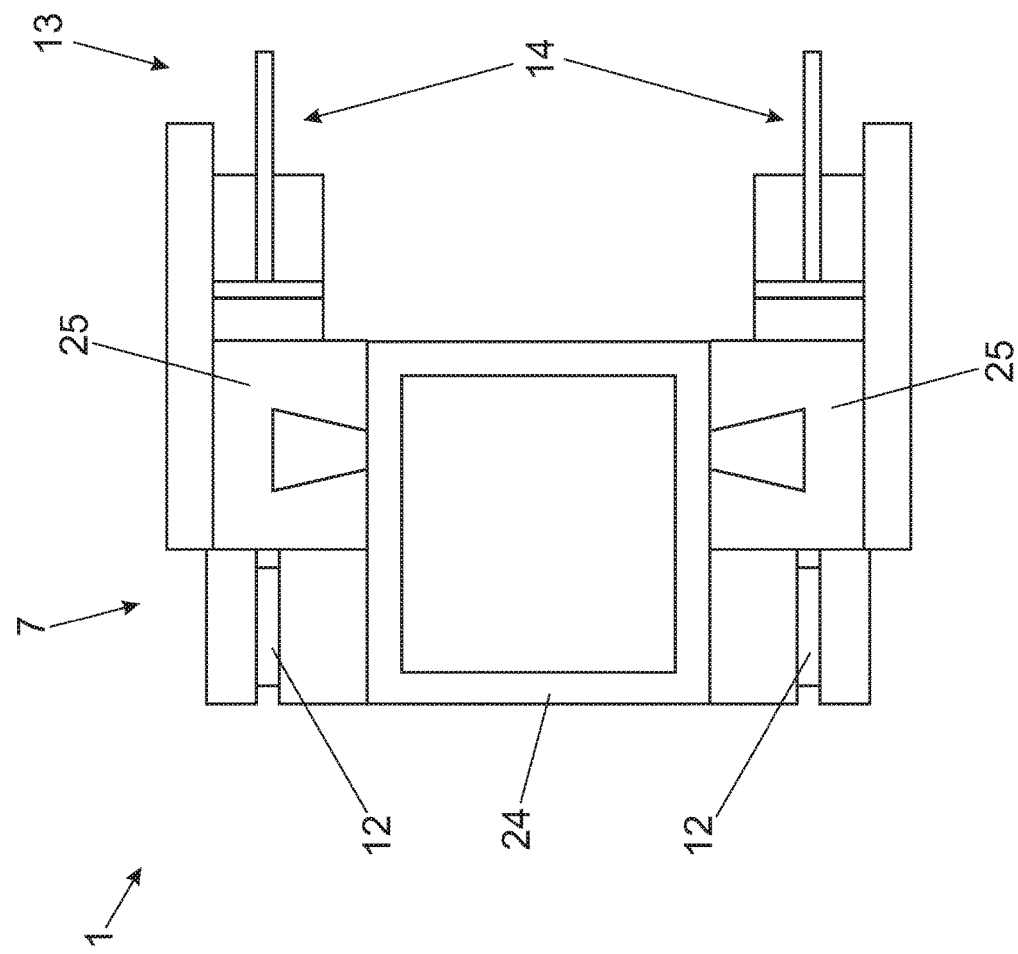
FIG. 3 schematically shows a mold transport device according to the invention.

Furthermore, the molds 5 comprise latching devices 13 with which the molds 5 (more precisely: the lower mold parts 8) can be latched to the belt drive 12. Of course, the molds 5 can also be unlatched by the latching devices 13 (not all latching devices 13 are provided with reference signs for reasons of clarity). The latching devices 13 are shown in FIGS. 2 and 3 more detailed.

A mold holding system for the tempering station 4 is not shown. However, the mold parts 8 of the mold 5 are built in such a way that they can be catched with a gripping system arranged at the tempering station 4. This makes it possible to close and to open the mold 5 by means of the tempering station 4.

FIG. 2 shows a side view of the heating station 2. Additionally to the elements known from FIG. 1, rods 23 for guiding the—in FIG. 2 upper—plate 9 are shown. It is to be noted that in this embodiment the stations 2, 4 comprise a lower base plate 9 and an upper plate 9 movable relatively to the lower base plate 9. (These are, thus, vertical presses.) Moreover, the latching devices 13 can be better recognized in FIG. 2. However, also in FIG. 3 the latching devices 13 are again visualized more distinct.

In FIG. 2, in addition, the mold arranged in the tempering station 4 is shown in dashed lines together with a semi-finished product therein. It is clear, therefore, that the—in this illustration upper—latching devices 13 are "further behind" in the picture, because they are holding the mold 5 arranged in the tempering station 4.

In the detailed view of FIG. 3, the structure of the mold transport device 7 together with the latching devices 13 is visualized precisely.

A profile pipe 24 builds the basis of the construction. The belt drive 12 circulates lengthwise around the pipe 24. Guides 25 are provided so that the molds 5 held by the latching devices 13 are not only held by the tension of the belt drive 12.

The latching devices 13 comprise pneumatically movable pins 14.

If the pins 14 are extended they can interact with openings 15 (see again FIG. 2) in the molds 5. Thereby a locking of the mold 5 relative to the guided parts of the guides 25 is reached. By retracting the pins 14 the molds 5 can be again unlocked from the belt drive 12.

In each of the FIGS. 1 and 2 the mold 5 is only shown schematically. A detailed example for a mold 5, which can be used with the invention, is shown in FIG. 4 in a section view. As can be recognized, the semi-finished product 3 has wall thickness leaps. For that, the recesses are arranged in the lower mold part 8.

It can also be recognized that also in the shown closed state, a small gap still exists between the mold parts 8. Nevertheless, the mold 5 serves its purpose, because it is ensured that the semi-finished product does not suffer considerable deformation in the heated state.

FIG. 5 shows an aspect of the invention with which it can be ensured that sufficient contact between a heating plate 21 or a tempering plate 22 and the mold 5—in particular a mold part 8—exists. Therefore, a flexible seal 26 is provided which substantially hermetically seals a room 27 between the heating plate 21 or the tempering plate 22 and the mold part 8. Via a suction device (not shown), the room 27 is put under low pressure. The seal 26 is formed flexible in such a way that it can be compressed by the low pressure to such an extent that surface contact or surface pressure is established between the mold part 8 and the heating plate 8 or the tempering plate 22, which surface contact or surface pressure provides for an optimal heat transfer between the mold part 8 and the heating plate 21 or tempering plate 22.

In the shown embodiment, the seal 26 is attached to the heating plate 21 and the tempering plate 22, respectively. For this reason, the seal 26 is partially sunk in a groove. The seal, however, can also be attached to the mold 5.

The FIGS. 6*a* and 6*b* show an embodiment of coupling elements 11 via which the mold parts 8 have a motion connection with the platens 9. For that, an actuator 30 is attached to the platen 9 via a flange 29. Of course, the actuator 30 could also be attached to the heating plate 21 and the tempering plate 22, respectively.

For example, the actuator 30 can be implemented hydraulically or pneumatically. The actuator 30 serves for displacing the latch 32 which interacts with a recess 31 at the mold part 8 in a closed state. Thereby, the coupling between the mold part 8 and the plate 9 is established. This enables opening of the at least one mold 5 by opening the platens 9.

Of course, the actuator 30 can again retract the latch 32 in a closed state of the at least one mold 5. Thereby, the platens 9 and the mold part 8 are again uncoupled and the at least one mold 5 can be transported further as a unit.

A possible operation method for an embodiment according to the FIGS. 1 to 6*b* is described in the following.

At the beginning of a cycle, the mold 5 is held by the mold holding device in the cooling press (tempering station 4) such that the press is opened in such a way that a mold part 8 is located at each tempering plate 22. If the mold 5 is opened the semi-finished product can be inserted. If the semi-finished product contains wall thickness leaps, such leaps have also to be realized in the mold 5. The recesses are preferably located in the lower mold half (mold part 8). If the semi-finished product 3 is inserted, the tempering station 4 (cooling press) and the mold 5 is closed. When the mold 5 is closed, the mold holding system again releases the mold 5. The lifting device 16 lifts the mold 5 so that the mold 5 can be latched to the mold change system (mold transport device 7). As soon as the mold 5 is handed over to the mold transport device 7, the lifting device 16 is sinking again. Thus, the mold 5 is only held by the mold transport device 7 and can, therefore, change positions. Arrived in the heating press (heating station 2), the lifting device 16 extends in order to take over the mold 5. If the mold 5 lies on the lifting device 16, the latching device 13 is unlatched and the mold 5 together with the semi-finished product can be lowered. After the mold 5 reaches contact with the lower heating plate 21, the heating station 2 is closed, whereby the mold 5 is on both sides in contact with the heating plates 21.

The heating plates 21 are constructed in such a way that they can transfer their stored heat energy into the mold 5 and, thus, also into the semi-finished product 3 as fast as possible. Therefore, the heating plates 21 have to be made from a material which preferably has a thermal conductivity of above 100 W/(m*K). Further, concerning the heating plates 21 one has to take care that they have a temperature homogeneity as high as possible and can deliver heat energy very fast in addition.

The temperature of the heating plates 21 has to be chosen in such a way that the consolidation temperature is reached as fast as possible. As the consolidation temperature, a temperature has to be chosen which is above the melting point of the thermoplastic. Further, the temperature of the heating plates 21 has to be chosen in such a way that the temperature difference between the center and the surface of the semi-finished product 3 is not too high. The temperature difference is dependent on the polymer. The temperature difference should not exceed 80° C. In the presently described variant, the temperature control is defined via the contact time with the hot heating plates 21. It is, however, possible to regulate the temperature by measuring the actual value of the temperature of the semi-finished product.

After the end of the heating time, the heating station 2 opens and the mold 5 is raised by the lifting device 16.

As the heating normally takes substantially more time than the cooling, a further semi-finished product 3 in the cooling press was inserted in the meantime in a second mold 5 and is already located at the lifting device 16. Thereby, no additional handling time arises for inserting and removing the semi-finished products 3.

Thus, the mold transport device 7 can now receive the molds 5 via the latching device 13 and the lifting device 16 lowers. Now the molds 5 can change their positions. This means, the mold 5 from the heating station 2 goes to the tempering station 4 and vice versa. If the molds 5 have changed the position, the lifting devices 16 of both presses extend in order to take over the mold 5. If the molds 5 are located on the lifting device 16, the connection to the mold transport device 7 is released and the molds 5 can be lowered onto the tempering plate 22 and the heating plate 21 respectively. The consolidation pressure has to be selected in such a way that the "fiber swimming" in the semi-finished product 3 is as small as possible. Preferably, a surface pressure below 10 bar is selected. Concerning the cooling press, the cooling time preferably has to be chosen in such a way that the semi-finished product 3 can be demolded as hot as possible. This would have the advantage in the case of a subsequent shaping process that the temperature difference to the shaping temperature could be held lower, and the subsequent heating process, thus, could be shortened.

After the end of the cooling time, the mold 5 is gripped again by the mold holding system and the press can be opened. As soon as the press is opened, the semi-finished product 3 can be removed and a new semi-finished product 3 can be inserted. In order to facilitate the removing of the semi-finished product 3 from the mold 5, an ejector can be user and/or the mold 5 can be refined with an anti-adhesive coating aligned with the polymer. As the tempering station 4 reaches very short cycle times and the semi-finished product 3 should be removed as hot as possible, it is conceivable to run the tempering plates 22 with a high temperature of above 100° C. As a subsequent result, this would have the advantage that the newly inserted semi-finished product 3 could already be pre-heated in the cooling press and, thus, the cycle time in the heat station 2 would reduce. By pre-heating in the tempering station 4, a smaller temperature difference and, thus, a lower amount of energy is necessary. However, when having a temporal control of the heating time, the temperature of the tempering station 4 has to be selected in such a way that the mold 5 and the semi-finished product 3, respectively, are always arriving in the heating station 2 with a very similar thermal state.

FIG. 7 shows in a top view an alternative embodiment with a rotary table 18 as a mold transport device 7. As can be recognized from the schematic illustration, the rotary axis is substantially between the tempering station 4 and the heating station 2. By rotating the rotary table 18, the molds 5 (together with the semi-finished products 3) can be transported from the heating station 2 into the tempering station 4 (and vice versa). In this embodiment, a lifting device 16 is not absolutely necessary.

Similar considerations apply to the embodiment according to FIG. 8 with a handling robot 19. The handling robot 19 receives a mold 5 together with a semi-finished product 3 in a receiving station 26 and transports them to the heating station 2. After the heating, the handling robot 19 transports the mold 5 together with the semi-finished product 3 to the tempering station 4 in order to cool the semi-finished product 3 correspondingly.

After this step, the handling robot 19 transports the mold 5 together with the semi-finished product 3 for further processing to a demold station 20 or a molding machine 10. Especially in the latter case, the semi-finished product 3 can also be already demolded in the tempering station 4, and only the semi-finished product 3 is transported to the molding machine 10.

The present invention is not limited to the embodiments shown herein.

Persons skilled in the art, e.g., know other devices which can serve for transporting the molds. Advantageously, a simultaneous or contemporary change of the molds 5 between the stations 2 and 4 can be provided.

Furthermore, during the heating process in the heating station 2, a low pressure (corresponds to negative pressure or vacuum) is present in order to increase the quality of consolidation.

The temperature in the mold 5 can be measured near to the semi-finished product 3. After reaching a threshold value, the procedure of a pre-defined soaking time (through heating time) starts. After the end of the soaking time the heating station 2 is opened again.

The invention claimed is:

1. An arrangement for consolidating thermoplastic semi-finished products, comprising:
   a heating station for heating a semi-finished product;
   a tempering station for tempering the semi-finished product;
   a mold to be arranged in the heating station and in the tempering station, the mold comprising a cavity for receiving the semi-finished product, the cavity substantially corresponding to a form of the semi-finished product;

a mold transport device configured to transport the mold is from the heating station into the tempering station and from the tempering station into the heating station; and lifting devices provided at the heating station and/or the tempering station, the lifting devices being configured to lift the mold to be lifted, the lifting devices including a hydraulic cylinder for lifting.

2. The arrangement according to claim 1, wherein the mold is a first mold of at least two molds.

3. The arrangement according to claim 1, wherein the mold comprises at least two mold parts, the cavity being formed when the at least two mold parts abut each other, and wherein the mold is openable by moving the mold parts away from each other.

4. The arrangement according to claim 1, wherein the heating station and/or the tempering station each comprise platens movable relative to each other for opening and closing the heating station and/or the tempering station.

5. The arrangement according to claim 3, wherein the tempering station comprises at least one coupling element configured to couple at least one of the at least two mold parts to at least one of the platens, whereby the mold is configured to be opened by opening the tempering station.

6. The arrangement according to claim 1, wherein the mold transport device comprises a belt drive.

7. The arrangement according to claim 6, further comprising at least one latching device for latching the mold to the belt drive, and for unlatching the mold from the belt drive.

8. The arrangement according to claim 7, wherein the latching device comprises movable pins.

9. The arrangement according to claim 1, wherein the lifting devices include at least two hydraulic cylinders for lifting.

10. The arrangement according to claim 1, wherein the mold transport device comprises a rotary table.

11. The arrangement according to claim 1, wherein the mold transport device comprises a handling robot.

12. The arrangement according to claim 1, further comprising a demold station separate from the heating station and from the tempering station, the demold station being configured to remove the semi-finished product from the mold, the mold transport device being configured to transport the mold from the tempering station to the demold station.

13. The arrangement according to claim 1, further comprising a receiving station configured to bring the semi-finished product to the mold, the mold transport device being configured to transport the mold from the receiving station to the heating station.

14. The arrangement according to claim 1, further comprising:
a molding machine for processing the consolidated thermoplastic semi-finished products, and
a handling device for transporting the semi-finished product to the molding device.

15. The arrangement according to claim 1, wherein the heating station comprises heating plates for heating the mold and/or wherein the tempering station comprises tempering plates for tempering the mold.

16. The arrangement according to claim 15, further comprising a suction device and a seal for substantially hermetically sealing a room between (i) the mold and (ii) the heating plates and/or the tempering plates, wherein the seal is flexible such that the mold contacts the heating plates and/or the tempering plates when the room is put under low pressure by the suction device.

17. The arrangement according to claim 4, wherein the tempering station comprises a coupling element with which at least one of the at least two mold parts can to at least one of the platens, whereby the mold can be opened by opening the tempering station.

18. The arrangement according to claim 1, wherein the tempering station is configured to cool the semi-finished product.

19. The arrangement according to claim 8, wherein the latching device comprises pneumatically movable pins.

* * * * *